US012241291B2

(12) United States Patent
Mensch et al.

(10) Patent No.: US 12,241,291 B2
(45) Date of Patent: Mar. 4, 2025

(54) VEHICLE DOOR COMPRISING A HANDLE ARRANGEMENT, AND VEHICLE

(71) Applicant: Witte Automotive GmbH, Velbert (DE)

(72) Inventors: Reinaldo Mensch, Wuppertal (DE); Ralf Höhn, Velbert (DE); Patrick Handl, Dormagen (DE)

(73) Assignee: Witte Automotive GmbH, Velbert (DE)

( * ) Notice: Subject to any disclaimer, the term of this patent is extended or adjusted under 35 U.S.C. 154(b) by 133 days.

(21) Appl. No.: 18/063,080

(22) Filed: Dec. 8, 2022

(65) Prior Publication Data

US 2023/0184010 A1 Jun. 15, 2023

(30) Foreign Application Priority Data

Dec. 10, 2021 (DE) ..................... 10 2021 214 163.3

(51) Int. Cl.
*E05B 85/18* (2014.01)
*E05B 81/76* (2014.01)
*E05B 85/10* (2014.01)

(52) U.S. Cl.
CPC ............ *E05B 85/18* (2013.01); *E05B 85/103* (2013.01); *E05B 81/76* (2013.01); *E05Y 2201/224* (2013.01); *E05Y 2400/854* (2013.01); *E05Y 2400/86* (2013.01); *E05Y 2600/46* (2013.01); *E05Y 2900/531* (2013.01)

(58) Field of Classification Search
CPC .......... E05B 81/76; E05B 81/78; E05B 81/86; E05B 85/10; E05B 85/103; E05B 85/107; E05B 85/18
See application file for complete search history.

(56) References Cited

U.S. PATENT DOCUMENTS 4,580,821 A * 4/1986 Genord, Jr. ............. E05B 85/14 292/DIG. 31
4,703,963 A * 11/1987 Ball ........................ E05B 85/10 292/336.3

(Continued)

FOREIGN PATENT DOCUMENTS

CN 109863280 A 6/2019
DE 19527888 A1 * 2/1997 ................ B60J 5/00

(Continued)

OTHER PUBLICATIONS

Machine generated translation of FR 3096713 A1. (Year: 2024).*

(Continued)

*Primary Examiner* — Eugene G Byrd
*Assistant Examiner* — Emily G. Brown
(74) *Attorney, Agent, or Firm* — Marshall & Melhorn, LLC

(57) ABSTRACT

A vehicle door may have a handle arrangement, where the door may also have a door support structure. The door may also have a shaft strip which is arranged on the upper side of the door support structure. The handle arrangement may be arranged movably, in particular pivotably, at the shaft strip. The handle arrangement may have a handle element which can be gripped on an exterior of the vehicle door. The handle element may be designed as a device which can be actuated in at least one direction for actively actuating at least two switching functions.

11 Claims, 5 Drawing Sheets

(56) References Cited

U.S. PATENT DOCUMENTS

| | | | | |
|---|---|---|---|---|
| 4,867,501 | A * | 9/1989 | Nomura | E05B 85/10 292/336.3 |
| 5,316,364 | A | 5/1994 | Ohya | |
| 9,156,335 | B1 * | 10/2015 | Harter | E05B 85/10 |
| 11,619,079 | B2 * | 4/2023 | Linden | E05B 79/06 292/336.3 |
| 11,897,320 | B2 * | 2/2024 | Walawender | E05B 85/10 |
| 2001/0004233 | A1 * | 6/2001 | Suparschi | G07C 9/00309 340/426.28 |
| 2004/0135380 | A1 * | 7/2004 | Bruderick | E05B 85/18 292/336.3 |
| 2004/0183655 | A1 * | 9/2004 | Takata | G07C 9/00309 340/5.72 |
| 2005/0151635 | A1 * | 7/2005 | Burkat | E05B 81/76 340/445 |
| 2009/0039671 | A1 * | 2/2009 | Thomas | E05B 85/107 292/336.3 |
| 2010/0007463 | A1 * | 1/2010 | Dingman | E05B 81/78 340/425.5 |
| 2016/0078701 | A1 * | 3/2016 | Guibbert | G07C 9/30 340/5.72 |
| 2019/0048628 | A1 | 2/2019 | Pudney et al. | |
| 2019/0284847 | A1 | 9/2019 | Malvy et al. | |
| 2020/0181952 | A1 * | 6/2020 | Velicanin | E05B 63/0056 |
| 2021/0172217 | A1 | 6/2021 | Linden et al. | |

FOREIGN PATENT DOCUMENTS

| | | | | |
|---|---|---|---|---|
| DE | 10232583 | A1 | 2/2003 | |
| DE | 102010056437 | A1 | 6/2012 | |
| DE | 102011052328 | A1 | 2/2013 | |
| DE | 102014107809 | A1 | 12/2015 | |
| DE | 102019102266 | A1 | 7/2020 | |
| DE | 102019112225 | A1 | 11/2020 | |
| DE | 102019131339 | A1 | 5/2021 | |
| DE | 102020132363 | A1 | 6/2021 | |
| EP | 1355022 | A2 | 10/2003 | |
| FR | 2749873 | A1 | 12/1997 | |
| FR | 3096713 | A1 * | 12/2020 | E05B 81/76 |

OTHER PUBLICATIONS

European Patent Office, Extended European Search Report in Application No. EP22212202, dated Apr. 18, 2023, 5 pages.

European Patent Office, Extended European Search Report in Application No. EP24192858, dated Nov. 13, 2024.

China National Intellectual Property Administration, Office Action in Application No. CN2022115698896, dated Dec. 3, 2024.

European Patent Office, Extended European Search Report in Application No. EP24192856, dated Nov. 26, 2024.

European Patent Office, Extended European Search Report in Application No. EP24192857, dated Nov. 18, 2024.

* cited by examiner

VEHICLE DOOR COMPRISING A HANDLE ARRANGEMENT, AND VEHICLE

FIELD

The invention relates to a vehicle door comprising a handle arrangement, and a vehicle comprising a vehicle door.

BACKGROUND

Door handles for vehicle doors are known in principle and are used, for example in motor vehicles, in order to enable a keyless unlocking of the vehicle. Sensors of these door handles are designed in the form of capacitive proximity switches, i.e. they measure the capacitance between an active electrode and an electrical ground potential.

SUMMARY

It is an object of the present invention to specify a vehicle door having a handle arrangement which is simple to assemble, and an improved function. Moreover, it is an object of the invention to specify a vehicle comprising such a vehicle door having an improved handle.

With regard to the vehicle door, and with regard to the vehicle, the object is achieved according to the invention by the features of the claims.

Advantageous developments of the invention are the subject matter of the dependent claims.

The vehicle door according to the invention comprises at least one handle arrangement, a door support structure, and a shaft strip which is arranged on the upper side of the door support structure, wherein the handle arrangement is arranged at the shaft strip so as to be movable, in particular rotationally, for example pivotable; or translationally, for example displaceable or movable; and comprises a handle element which can be gripped on an outside of the vehicle door, and wherein the handle element is designed as a device which can be actuated in at least one direction for actively actuating at least two switching functions.

Preferably, the handle element can be actuated in at least two directions for actively actuating at least two or more switching functions.

Depending on the vehicle door, this can also have a vehicle frame which adjoins the door support structure.

The advantages achieved with the invention are in particular that a vehicle door comprising such a multi-functional handle element requires fewer components and can be produced simply and cost-effectively. In addition, such a multi-functional handle element having fewer components also requires less installation space. Moreover, the conventional recessed handle is omitted given an arrangement of the handle arrangement at a shaft strip in the internal structure of the door. Thus, in a simple and cost-effective manner, a flush-mounted design is achieved relative to conventional, cost-intensive, extensible handle systems.

In one possible embodiment, the handle arrangement comprises a handle support which comprises a fixed support part which is connected to the door support structure, and a movable support part at which the handle element can be arranged to form a form fit and/or force fit. The movable support part and the handle element are connected to one another in a rotationally fixed manner. The movable support part is mounted at the fixed support part so as to be movable, in particular rotatable or linearly movable, in particular displaceable or mobile. The axis of rotation of the movable support part corresponds to the axis of rotation of the handle element.

By means of the movable support part, the handle element fastened thereto can be moved in one or in various directions. A plurality of switching points or switching functions can hereby be generated. Thus, for example, a locking of a lock of the vehicle door and/or of the vehicle can be switched by means of a pressure force which acts on the handle element. An unlocking of the lock of the vehicle door and/or of the vehicle can be switched by means of a tensile force which acts on the handle element.

In addition, the handle element itself and its arrangement at the movable support part can be configured in such a way that actuating forces of different magnitudes, acting on the handle element, generate correspondingly different switching functions or switching points. For example, for actuating forces of different magnitudes, force threshold values can be predefined or predetermined which generate or trigger different switching functions or switching points. For example, a low force on the handle element can effect a locking of a lock, and a higher force on the handle element can effect a double locking of a lock. Alternatively or additionally, a displacement speed of a displaceable vehicle door can be set according to the actuating force acting on the handle element. For example, given a higher actuating force an increase in the displacement speed can be effected, and given a lower actuating force a reduction of the displacement speed can be effected.

In one possible embodiment, the handle element is articulated at the handle support. For example, the axis of rotation of the handle element is arranged in the region of the handle support or the shaft strip. The handle support is in particular arranged in a cavity of the door support structure, in particular between an inner door skin and an outer door skin. Via such a pivot joint for the handle element, arranged on the inner handle support, the displacement mechanism of the handle element is arranged in a protected manner, in particular with respect to mechanical stress and contamination.

A further aspect provides that the handle support is provided with a sensor which comprises a first metal surface and a second metal surface arranged at a distance therefrom and movable in the direction of the first metal surface, and an electronic unit, by means of which a capacitance change or inductance change caused by the change in the distance between the metal surfaces can be detected. The distance between the first metal surface and the second metal surface can be in the range of 0.1 to 5 mm and, for example, can be 1 mm or 1.5 mm. The second metal surface is arranged in particular at the handle element and/or at the movable support part. A minimal movement, in particular pivoting, of the handle element and of the movable support part, caused by a contacting of the handle element, can thereby already lead to a corresponding rotation of the second metal surface relative to the first metal surface. A change, resulting therefrom, in the distance between the two metal surfaces leads to a corresponding capacitance change or inductance change which can be detected by means of the electronic unit. The intervening space between the metal surfaces preferably has a dielectric medium which is, for example, a gas, in particular air, and/or an elastically deformable solid, such as a plastic foam or the like.

For example, the first metal surface is arranged at the fixed support part, and the second metal surface is arranged at the movable support part. The second metal surface, for example a metal strip or a thin metal sheet, is arranged on one side of the movable support part, in particular is fastened, for example glued or soldered. The handle element is arranged on the opposite side of the movable support part. An actuation, in particular pivoting, of the handle element produces a corresponding movement, in particular pivoting, of the movable support part, and therewith of the second metal surface relative to the first metal surface. In particular, the handle element is displaceable, in particular rotationally displaceable, in particular pivotable; or translationally displaceable, in particular slideable or movable, between a first switching movement directed away from the vehicle door and a second switching movement directed towards the vehicle door. The sensor is thereby configured such that in particular the smallest movements of the handle element, for example in a range of 0.1 mm to 5 mm, are detected as a switching movement.

Moreover, the electronic unit is designed to trigger a first predefined or programmable switching function or action—for example, unlocking one or all vehicle doors of a vehicle—upon detection of the first switching movement, and to trigger a second predefined or programmable switching function or action—for example, locking the or all vehicle doors of the vehicle, in particular the electronic locks thereof—upon detection of the second switching movement. In addition, the electronic unit can be designed to trigger further switching functions—for example, given an automatic sliding door of a vehicle, to change the speed of the displacement movement of the sliding door, or to switch drive systems on or off—upon exceeding a predetermined threshold value of a detected capacitance change or inductance change. In addition, the haptics at the handle element, in particular the required actuating force for triggering the switching functions, can be parameterized via such parameterizable switching functions, by means of predetermined threshold values of the detected capacitance changes or inductance changes. It is thus possible to parameterize lower actuating forces for triggering switching functions.

A further aspect provides that the shaft strip comprises a support bar which protrudes substantially perpendicularly, on which the handle arrangement is arranged to form a form fit and/or force fit, and in particular is mounted so as to be movable in a limited manner. For example, the handle support can have a first end stop for limiting the first switching movement of the handle element, and a second end stop for limiting the second switching movement of the handle element.

According to a further embodiment, in addition to the sensor described in the preceding, a capacitive proximity switch for further switching functions, for example unlocking or locking of the vehicle, can be provided at the handle element. The sensor described in the preceding is arranged internally in the vehicle door, at the inner handle support. The capacitive proximity switch is arranged on the outside of the handle element. It is understood that, for a proper functioning of the proximity switch, it is to be ensured that the active electrode of the proximity switch is not metallically shielded.

DESCRIPTION OF THE FIGURES

Exemplary embodiments of the invention are explained in greater detail with reference to the drawings, in which.

DETAILED DESCRIPTION

Parts corresponding to one another are provided with the same reference signs in all the drawings.

Figure 1:
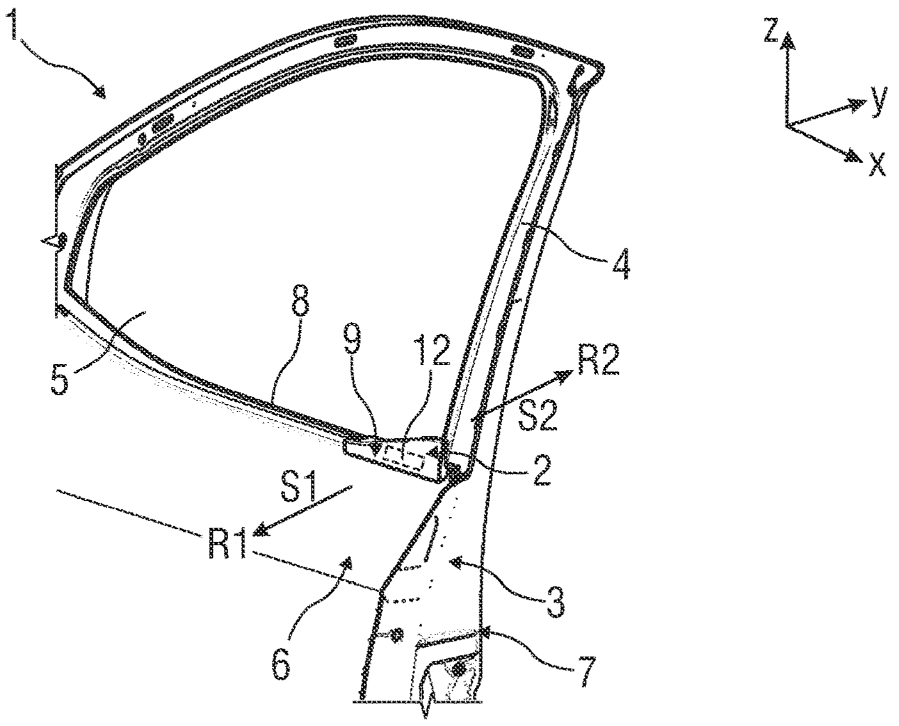
FIG. 1 shows schematically, in perspective presentation, a vehicle door comprising a handle arrangement.

FIG. 1 schematically shows, in perspective presentation, a vehicle door 1 comprising a handle arrangement 2. The handle arrangement 2 is an external door handle.

The vehicle door 1 comprises a door support structure 3 and a door frame 4. Alternatively, the vehicle door 1 can be designed so as to be frameless (not shown) and have no door frame 4, for example given a convertible. The invention is applicable both to vehicle doors 1 comprising a door frame 4 and to frameless vehicle doors 1. The invention is described below for a vehicle door 1 with door frame 4.

The door frame 4 has a window aperture 5 which can be closed by a window pane (not shown in greater detail). For this purpose, the window pane is arranged movably in the door support structure 3 in the usual manner, in particular between a closed position in which the window pane is raised and the window aperture 5 is closed, and an open position in which the window pane is lowered into the door support structure 3 and the window aperture 5 is opened.

The door support structure 3 has, for example, an exterior vehicle skin 6 and an interior vehicle skin 7. The door support structure 3 is made of a sheet metal which is usually painted. The door support structure 3 can be clad on the inside.

The vehicle door 1 moreover comprises a shaft strip 8. The shaft strip 8 is arranged on the upper side of the door support structure 3. A narrow longitudinal gap, through which the window pane is moved, is provided at the door support structure 3, for example on the upper side. The shaft strip 8 is arranged in the region of the longitudinal gap and extends along the door support structure 3 on both sides of the window pane. The shaft strip 8 serves to seal between the door support structure 3 and the window pane. A penetration, in particular of water, dirt, snow, but also of wind, into the door support structure 3 is therewith prevented.

The shaft strip 8 usually comprises two soft sealing lips which are situated on both sides of the window pane. They are movable so that noise is avoided upon moving the window pane.

The handle arrangement 2 is arranged movably, in particular pivotably, at the shaft strip 8. Alternatively, the handle arrangement 2 can be designed to be movable in translation, in particular displaceable or shiftable (not shown in greater detail). The invention can be applied both to a rotationally movable handle arrangement 2 and to a handle arrangement 2 movable in translation. The invention is described below for a rotationally movable, in particular pivotable, handle arrangement 2.

The handle arrangement 2 comprises a handle element 9 which can be gripped on an outside of the vehicle door 1. The handle element 9 is designed in such a way that it is designed as a device which can be operated in at least two directions R1, R2 for actively actuating at least two switching functions. Alternatively, the handle element 9 can also be designed for active actuation of at least two switching functions only in one of the directions R1 or R2.

The handle element 9 protrudes perpendicularly upwards from the shaft strip 8 and the door support structure 3. The handle element 9 is thereby arranged at a distance from the door frame 4.

Optionally, a capacitive proximity switch 12 can be provided at the handle element 9 for further switching functions, for example unlocking or locking of the vehicle. The capacitive proximity switch 12 is arranged on the outside of the handle element 9. It is understood that, for a proper functioning of the proximity switch, it is to be ensured that the active electrode of the proximity switch is not metallically shielded.

Such a movable handle arrangement 2 provided at the shaft strip 8 can be of compact design, enables a plurality of switching functions, and requires little installation space.

Figure 2:
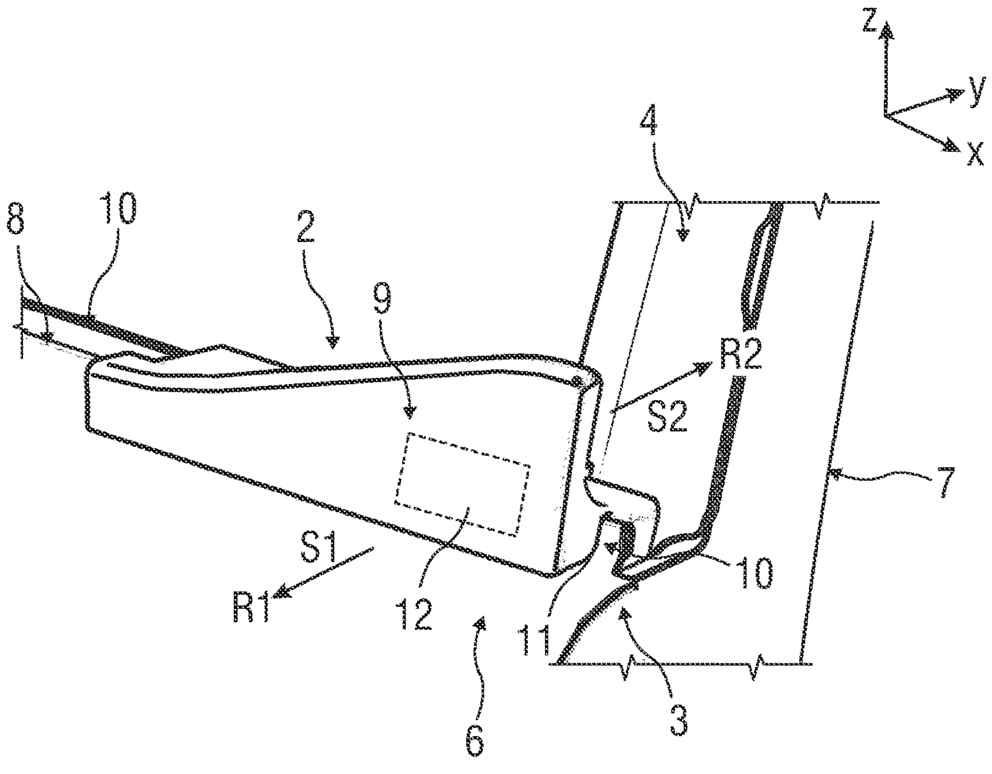
FIG. 2 shows schematically an enlarged detail of the perspective presentation according to FIG. 1, in the region of the handle arrangement.

FIG. 2 schematically shows an enlarged detail of the perspective presentation according to FIG. 1 in the region of the handle arrangement 2.

The shaft strip 8 additionally comprises a support strip 10 protruding substantially perpendicularly. The support strip 10 can be of flexible design. The support strip 10 can additionally be designed as a sealing lip. The support strip 10 extends along the shaft strip 8 and the door support structure 3. The handle arrangement 2 is arranged on the support strip 10, in particular to form a form fit and/or force fit, and mounted so as to be movable in a limited manner. In particular, the handle arrangement 2 is movably mounted on the support strip 10, in particular so as to be movable in translation or in rotation, for the smallest movements of the handle element 9, for example in a range from 0.1 mm to 5 mm, in particular 0.1 mm to 2 mm, or 1 degree to 10 degrees, in particular 1 degree to 5 degrees. For example, the handle element 9 comprises a groove 11 corresponding to the support strip 10, in particular a longitudinal groove. The handle arrangement 2 can be plugged or pushed onto the support strip 10. In the assembled state of the handle arrangement 2 at the vehicle door 1, the support strip 10 is arranged completely in the groove 11, as shown in FIG. 2.

The handle element 9 is, for example, ergonomically shaped and can be gripped, in particular encompassed, by one hand of a user. The handle element 9 can thereby be arranged so as to be displaceable, in particular pivotable, between a first switching movement S1, directed away from the vehicle door 1, in the direction R1, and a second switching movement S2, directed towards the vehicle door 1, in the direction R2. Different switching functions can hereby be parameterized, as is described in more detail below.

Figure 3:
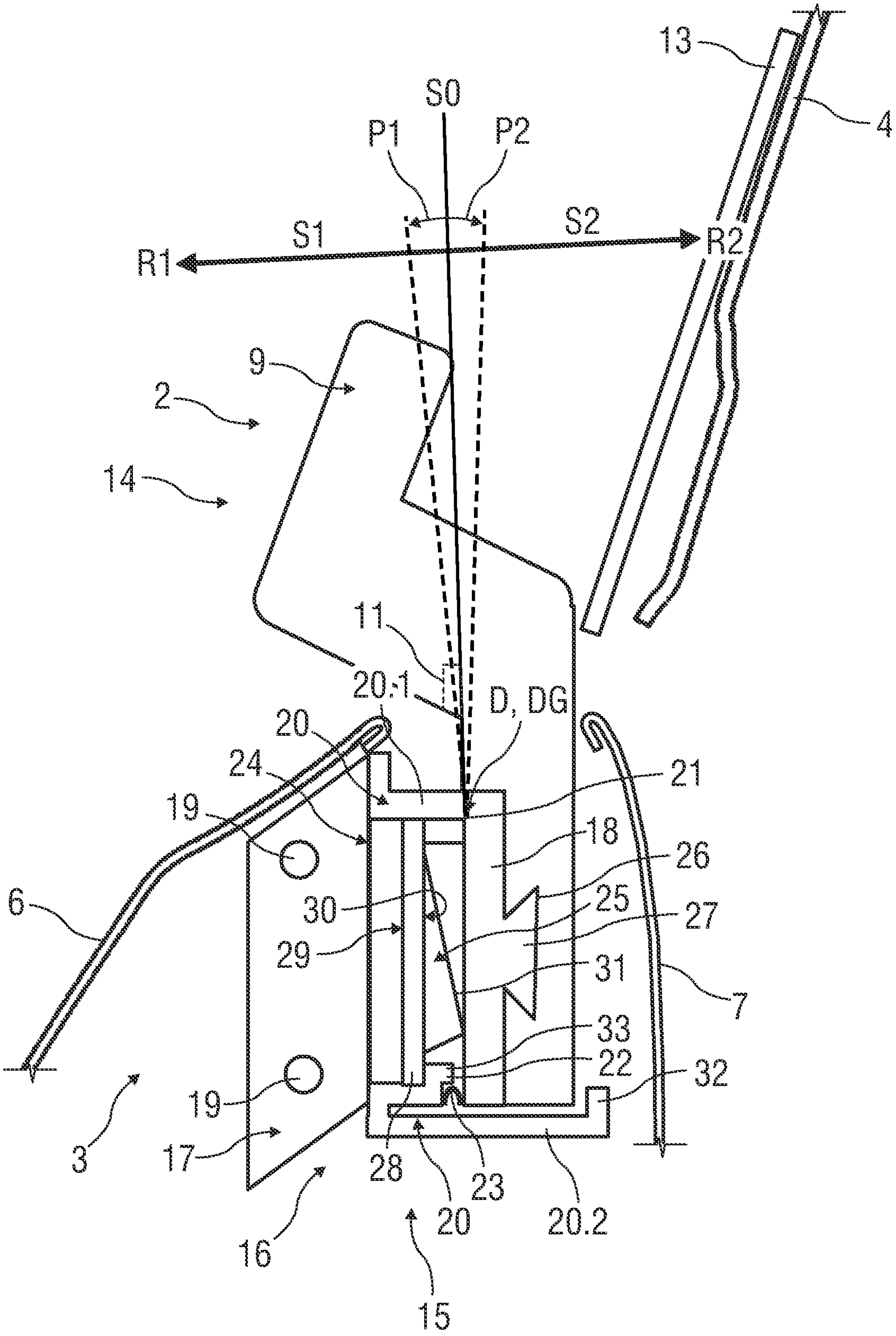
FIG. 3 shows schematically a sectional presentation through the vehicle door in the region of the handle arrangement.

FIG. 3 schematically shows a sectional view through the vehicle door 1 in the region of the handle arrangement 2. For better clarity, the shaft strip 8 is not shown in more detail.

The door frame 4 is usually covered by means of a panel 13, in particular a plastic panel.

The handle arrangement 2 is arranged between the door frame 4 and the door support structure 3 so as to be relatively movable with respect to the shaft strip 8. The handle arrangement 2 is a multi-component part and can be pre-assembled to form a mounting unit 14 and be inserted and mounted in the vehicle door 1. In particular, the handle arrangement 2 is arranged in a cavity 15 between the exterior vehicle skin 6 and the interior vehicle skin 7.

The handle arrangement 2 comprises a handle support 16. The handle support 16 is made of plastic or a fiber-reinforced plastic material. The handle support 16 comprises a fixed support part 17 and a movable support part 18. The handle support 16 is arranged in the vehicle door 1, in particular in the cavity 15, between the exterior vehicle skin 6 and the interior vehicle skin 7.

The fixed support part 17 is connected to the door support structure 3. For example, the fixed support part 17 is plate-shaped. The fixed support part 17 moreover comprises a fastening interface 19 for fastening the fixed support part 17 to the door support structure 3. For example, the fixed support part 17 is screwed or riveted to the door support structure 3 by means of the fastening interface 19.

Substantially perpendicular webs or walls 20 protrude from the fixed support part 17 in the direction of the movable support part 18. Alternatively, the fixed support part 17 can be shell-shaped or box-shaped. The movable support part 18 is movably, in particular rotatably, arranged, for example articulated, on a first wall 20.1, in particular that wall 20.1 arranged in the direction of the shaft strip 8, of the fixed support part 17. For example, a pivot joint 21 or hinge, in particular a pliable or flexible hinge, is arranged between the movable support part 18 and the first wall 20.1. The movable support part 18 is thereby rotatable about an axis of rotation D relative to the fixed support part 17. The movable support part 18 is designed as a cap or a cover of the handle support 16. For this purpose, the one end of the movable support part 18 is rotatably articulated on the first wall 20.1.

In a rest position or starting position S0 of the handle element 9, the opposite free end of the movable support part 18 is arranged at a distance from a second wall 20.2, in particular at a distance from an inner shoulder 22. A seal 23, in particular a sealing lip, can be arranged between the movable support part 18 and the fixed support part 17, in particular in the region of the shoulder 22.

The handle element 9 is articulated at the handle support 16. For example, the axis of rotation DG of the handle element 9 is arranged in the region of the handle support 16 (as shown) or of the shaft strip 8 (not shown in greater detail). The axis of rotation D of the movable support part 18 corresponds to the axis of rotation DG of the handle element 9. The axis of rotation DG is in particular an imaginary axis of rotation.

The handle element 9 is arranged to form a form fit and/or force fit at the handle support 16, in particular at the movable support part 18. The movable support part 18 and the handle element 9 are connected to one another in a rotationally fixed manner. For example, the handle element 9 has a receiving profile 26 in the direction of the handle support 16, and the movable support part 18 has a correspondingly designed retention profile 27 in the direction of the handle element 9. The receiving profile 26 and the retention profile 27, or vice versa, are designed for example for a detachable connection as a tongue-and-groove connection or a pin connection, in particular a dovetail connection. The handle element 9 is hereby arranged to form a form fit and detachably at the movable support part 18.

Via such a pivot joint 21 for the handle element 9, arranged at the inner handle support 16, the displacement mechanism of the handle element 9 is arranged protected within the vehicle door 1, in the cavity 15, in particular with respect to mechanical stress and contamination.

In the mounted state, the walls 20, the movable support part 18, and the fixed support part 17 of the handle support 16 form a housing 24 for a sensor 25. The sensor 25 comprises an electronic unit 28. The electronic unit 28 is arranged and held at the fixed support part 17. Optionally, a potting material 29 can be arranged between the fixed support part 17 and the electronic unit 28.

The sensor 25 is, for example, a capacitive sensor or an inductive sensor.

The sensor 25 comprises a first metal surface 30 and a second metal surface 31 arranged at a distance therefrom, which second metal surface 31 is movable in the direction of the first metal surface 30. Such a sensor 25 is also referred to as an "MoC sensor" (MoC=metal over cap or metal over capacitive, or as a capacitive tactile sensor). The metal surfaces 30, 31 are also referred to as MoC plates.

For example, the first metal surface 30 is arranged on the fixed support part 17, and the second metal surface 31 is arranged on the movable support part 18 and/or the handle element 9.

The second metal surface 31, for example a metal strip or a thin metal sheet, is arranged, in particular fastened, for example glued or soldered, on one side of the movable support part 18. The handle element 9 is arranged and held on the opposite side of the movable support part 18.

An actuation, in particular pivoting, of the handle element 9 produces a corresponding movement, in particular pivoting, of the movable support part 18, and therewith of the second metal surface 31, relative to the first metal surface 30, about the identical axes of rotation D, DG.

In particular, the handle element 9 is displaceable, in particular pivotable, between the first switching movement S1 in the direction R1 away from the vehicle door 1 and the second switching movement S2 in the direction R2 towards the vehicle door 1. In the non-actuated state, the handle element 9 is positioned in a starting position S0. Upon actuation, the handle element 9 can be pivoted in a range between +/−5° with respect to the initial position S0, according to arrows P1, P2.

The distance between the first metal surface 30 and the second metal surface 31 can be in the range of 0.1 to 2 mm and, for example, can be 1 mm or 1.5 mm. The intervening space between the metal surfaces 30, 31 preferably has a dielectric medium which is, for example, a gas, in particular air, and/or an elastically deformable solid, such as a plastic foam or the like.

The electronic unit 28 detects a change in the distance between the metal surfaces 30, 31, and/or a capacitance change or inductance change, caused by the movement of the handle element 9. A minimum movement, in particular pivoting, of the handle element 9 and of the movable support part 18, caused by a contacting of the handle element 9, can thereby already lead to a corresponding rotation of the second metal surface 31 relative to the first metal surface 30. A change resulting therefrom in the distance between the two metal surfaces 30, 31 leads to a corresponding capacitance change or inductance change, which can be detected by means of the electronic unit 28.

In order to limit the first switching movement S1 of the handle element 9, the handle support 16 comprises a first end stop 32. In order to limit the second switching movement S2, the handle support 16 comprises a second end stop 33. The first end stop 32 is arranged at the free end of the protruding second wall 20.2 and limits the first switching movement S1. The second end stop 33 is formed in the housing 24 by the inner shoulder 22. The inner shoulder 22 or second end stop 33 is arranged on the electronic unit 28, in particular a printed circuit board, or above this in the housing 24.

By means of the movable support part 18, the handle element 9 fastened thereto can be moved in different, in particular opposite and/or perpendicular, directions R1, R2. A plurality of switching points or switching functions can hereby be generated. A locking of a lock of the vehicle door 1 and/or of the vehicle can thus be switched, for example by means of a pressure force which acts on the handle element 9. An unlocking of the lock of the vehicle door 1 and/or of the vehicle can be switched by means of a tensile force which acts on the handle element 9.

In addition, the handle element 9 itself and its arrangement on the movable support part 18 can be configured such that operating forces of different magnitudes, acting on the handle element 9, generate correspondingly different switching functions or switching points. For actuating forces of different magnitudes, force threshold values can be predefined or predetermined which generate or trigger different switching functions or switching points. For example, a low force on the handle element 9 can effect a locking of a lock, and a higher force on the handle element 9 can effect a double locking of a lock. Alternatively or additionally, a displacement speed of a displaceable vehicle door 1 can be set according to the actuating force acting on the handle element 9. For example, an increase in the displacement speed can be effected given a higher actuating force, and a decrease in the displacement speed can be effected given a lower actuating force.

Moreover, the electronic unit 28 can be designed to trigger a first predefined or programmable switching function or action, for example unlocking one or all vehicle doors 1 of a vehicle, upon detection of the first switching movement S1, and to trigger a second predefined or programmable switching function or action, for example locking the or all vehicle doors 1 of the vehicle, in particular the electronic locks thereof, upon detection of the second switching movement S2. In addition, the electronic unit 9 can be designed to trigger further switching functions upon exceeding a predetermined threshold value of a detected capacitance change or inductance change, for example—given an automatic sliding door of a vehicle—to change the speed of the displacement movement of the sliding door, or to switch drive systems on or off.

Figure 4:
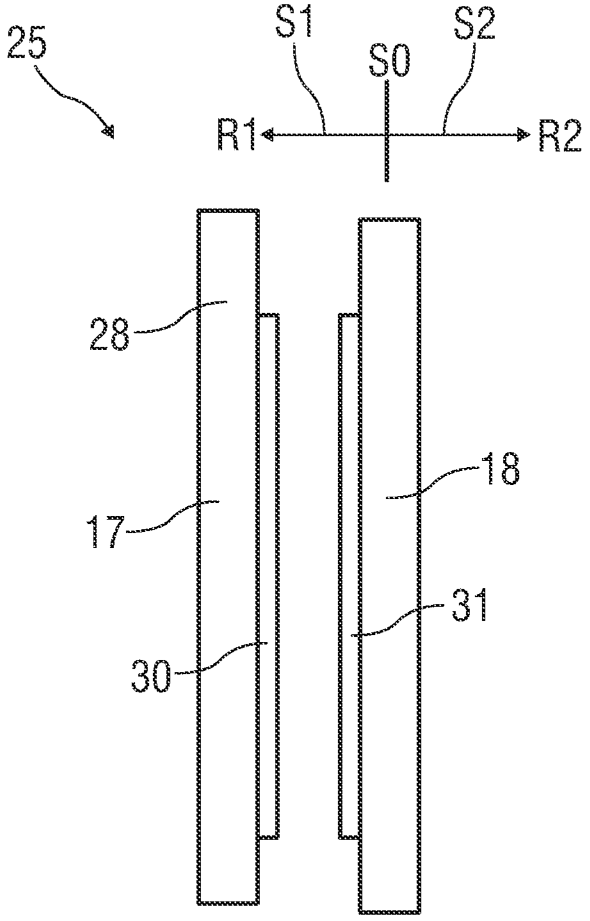
FIG. 4 shows a schematic block diagram of a sensor of the handle arrangement.

FIG. 4 shows a schematic block diagram of the sensor 25 of the handle arrangement 2.

The sensor 25 comprises the first metal surface 30 and the second metal surface 31. The first metal surface 30 is arranged on the fixed support part 17. For example, the first metal surface 30 is arranged as a metal strip or metal sheet on the printed circuit board of the electronic unit 28. The second metal surface 31 is arranged on the movable support part 18.

Figure 5:
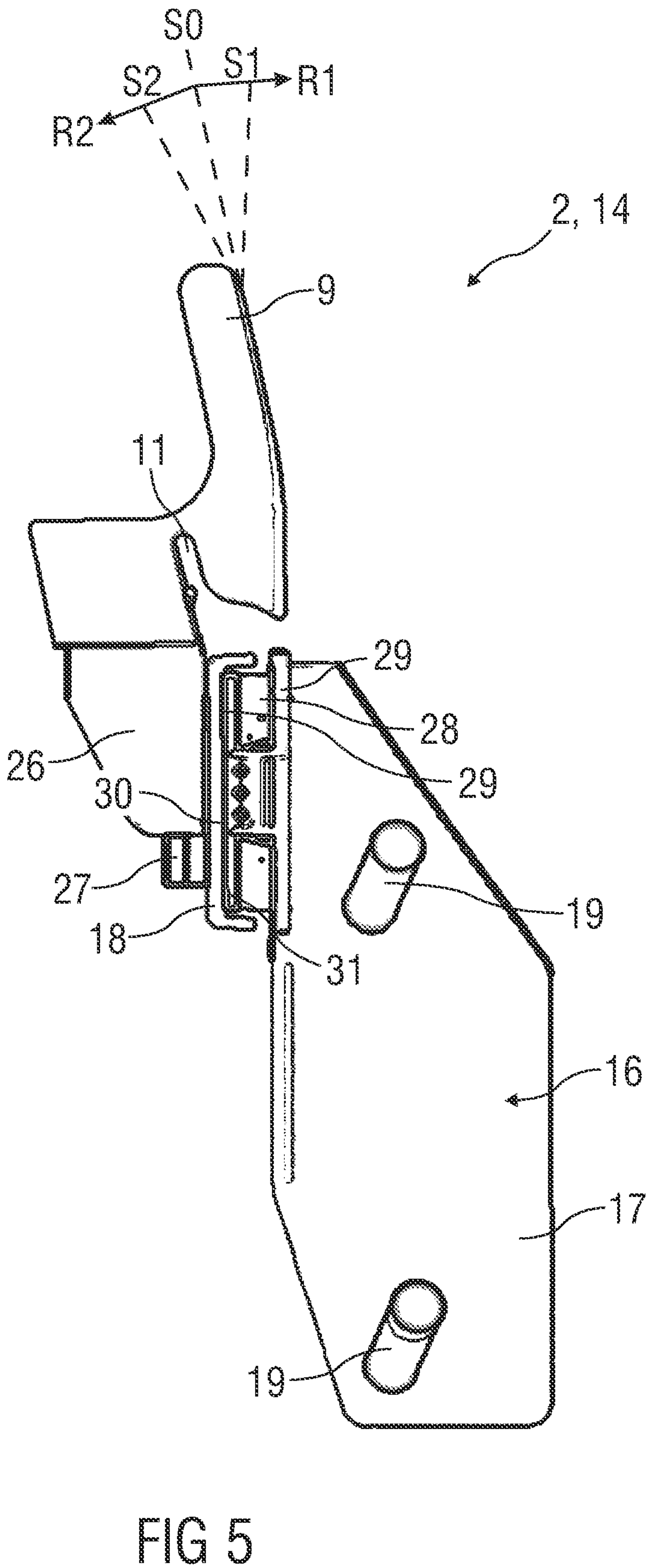
FIG. 5 shows a perspective presentation of a handle arrangement as a mounting unit.

FIG. 5 shows a perspective presentation of the handle arrangement 2 as a mounting unit 14.

Figure 6:
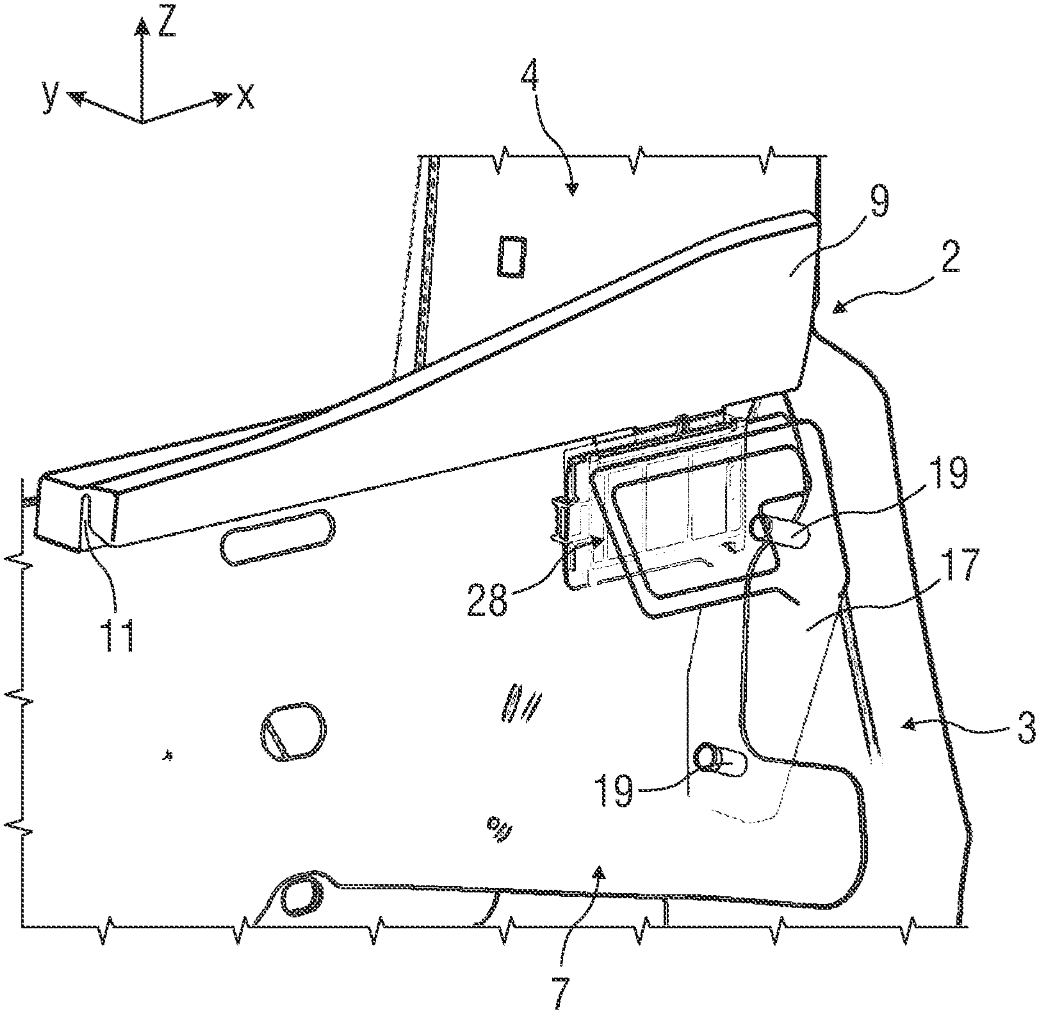
FIG. 6 shows schematically a perspective presentation of the vehicle door without exterior vehicle skin and with handle arrangement as a mounting unit.

FIG. 6 schematically shows a perspective presentation of the vehicle door 1 without exterior vehicle skin 6 and without shaft strip 8, and comprising the handle arrangement 2 as a mounting unit 14.

LIST OF REFERENCE SIGNS

1 Vehicle door
2 Handle arrangement
3 Door support structure
4 Door frame
5 Window aperture
6 Exterior vehicle skin
7 Interior vehicle skin
8 shaft strip
9 Handle element
10 Support strip
11 Groove
12 Proximity switch
13 Panel

14 Mounting unit
15 Cavity
16 Handle support
17 Fixed support part
18 Movable support part
19 Fastening interface
20 Wall
20.1 First wall
20.2 Second wall
21 Pivot joint
22 Shoulder
23 Seal
24 Housing
25 Sensor
26 Receiving profile
27 Retention profile
28 Electronic unit
29 Potting material
30 First metal surface
31 second metal surface
32 First end stop
33 Second end stop
D, DG Axis of rotation
P1, P2 Arrow
R1, R2 Direction
S1, S2 Switching movement
S0 Starting position

The invention claimed is:

1. A vehicle door comprising a handle arrangement, wherein the vehicle door comprises:

a door support structure, a shaft strip which is arranged on the upper side of the door support structure, wherein the handle arrangement is arranged pivotably at the shaft strip, and comprises a handle element which can be gripped on an exterior of the vehicle door, and wherein the handle element is designed as a device which can be actuated in at least one direction for actively actuating at least two switching functions, wherein the shaft strip comprises a support strip which protrudes substantially perpendicularly and on which the handle arrangement is arranged to form a form fit and/or force fit, and is mounted so as to be movable in a limited manner.

2. The vehicle door according to claim 1, wherein the handle element can be operated in at least two directions for actively actuating at least two switching functions.

3. The vehicle door according to claim 2, wherein the handle arrangement comprises a handle support which comprises a fixed support part connected to the door support structure, and a movable support part at which the handle element can be arranged to form a form fit and/or force fit.

4. The vehicle door according to claim 3, wherein the handle element is hinged at the handle support.

5. The vehicle door according to claim 4, wherein an axis of rotation of the handle element is arranged in a region of the handle support or of the shaft strip.

6. The vehicle door according to claim 3, wherein the handle support is provided with a sensor which comprises: a first metal surface, and a second metal surface arranged at a distance therefrom, which is arranged so as to be movable relative to the first metal surface, and an electronic unit adapted to detect a capacitance change or inductance change caused by the change in the distance between the metal surfaces.

7. The vehicle door according to claim 6, wherein the first metal surface is arranged on the fixed support part and the second metal surface is arranged on the movable support part.

8. The vehicle door according to claim 6, wherein the handle element is pivotable between a first switching movement directed away from the vehicle door and a second switching movement directed towards the vehicle door.

9. The vehicle door according to claim 8, wherein the electronic unit is designed to trigger a first predefined or programmable action upon detection of the first switching movement, and to trigger a second predefined or programmable action upon detection of the second switching movement.

10. The vehicle door according to claim 8, wherein the handle support has a first end stop for limiting the first switching movement, and a second end stop for limiting the second switching movement.

11. A vehicle comprising at least one vehicle door according to claim 1.

* * * * *